Figure 1:
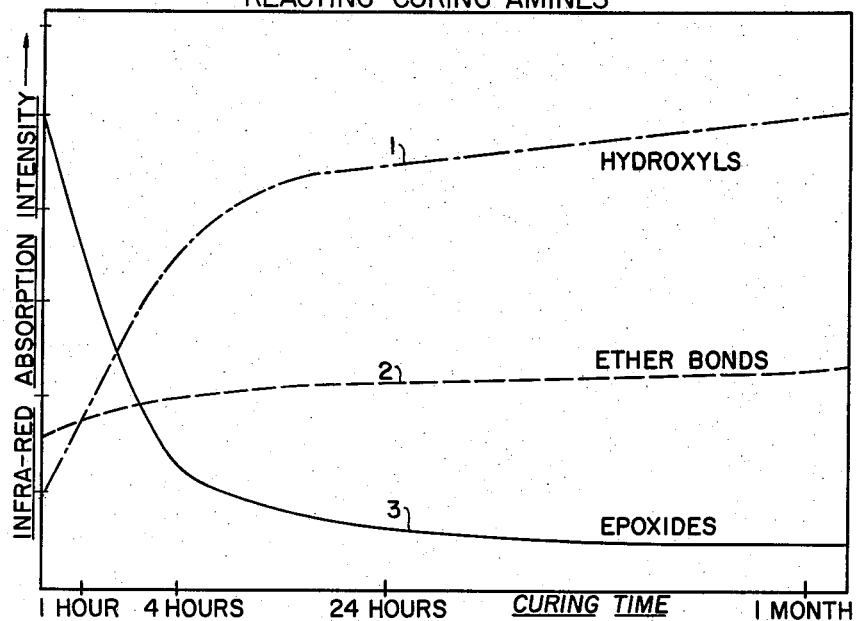

Feb. 27, 1962 A. DAMUSIS 3,023,190
METHOD OF AMINE CURING EPOXY RESINS
AND COMPOSITION THEREFOR
Filed Aug. 10, 1955

INVENTOR.
ADOLF DAMUSIS
BY Robert E. Bielek
ATTORNEY

United States Patent Office 3,023,190
Patented Feb. 27, 1962

3,023,190
METHOD OF AMINE CURING EPOXY RESINS AND COMPOSITION THEREFOR
Adolf Damusis, Cleveland, Ohio, assignor to The Sherwin-Williams Company, Cleveland, Ohio, a corporation of Ohio
Filed Aug. 10, 1955, Ser. No. 527,465
2 Claims. (Cl. 260—47)

This invention relates, as indicated, to the amine curing of polyepoxy-polyhydroxy ether resins.

More specifically, this invention relates to the chemical curing or hardening of polyepoxy-polyhydroxy ether resins employing a mixture of a catalyzing curing amine and a reacting curing amine.

The present system of curing epoxy resins with amines consists of mixing the proper amount of an amine into the composition containing the epoxy resin shortly before the composition is to be used disregarding any differences between catalyzing and reacting curing amines. This procedure has certain drawbacks which include the excessive embrittlement of films upon aging, hazing and thermoplasticity of the films, sensitivity of the cured material to some solvents, very short pot life, poor flow, unsatisfactory gloss, and unpredictable adhesion to such materials as aluminum and glass.

The curing of epoxy resins with amines as now done is more or less a hit and miss method, yielding products which although having certain desired characteristics, also have characteristics which are definitely undesirable and detrimental.

It is a principal object of this invention to provide a method of curing epoxy resins which alleviates the problems mentioned above.

A further object of this invention is to provide a method of curing epoxy resins with amines which incorporates into the cured material all of the beneficial properties desired and minimizes the undesired properties.

Another object of this invention is to provide a novel curing composition for epoxy resins.

Other objects will appear as the description proceeds.

The amines useful herein to effect the cure of epoxy resins may be classified into two categories. The first class, including the primary polyamines and certain secondary polyamines, is that of the reacting curing amines. Such amines must contain at least one active or available hydrogen attached to each of at least two amino-nitrogen atoms and further, do not contain an alkyl group of from 1 to 3 carbon atoms on an amino-nitrogen atom. These amines react or bridge with the epoxide groups of the epoxy resin molecule to form long linear molecules. Mono primary amines may react with epoxy resins but will not cure as a reacting curing polyamine because of the inability to bridge with two epoxy resin molecules.

The second class is that of catalyzing curing amines. Tertiary amines, mono or poly, which contain at least one short chain alkyl group of from 1 to 3 carbon atoms attached to a tertiary nitrogen group, are catalyzing curing amines. Certain secondary amines are also catalyzing curing amines.

Although methyl, ethyl and propyl mono primary amines may be considered as belonging to the class of catalyzing curing amines, they are unsatisfactory for the most part. Methyl and ethyl mono amines boil at below room temperature and are difficult to handle. Propyl mono amines are much too volatile and have low catalyzing efficiency.

The reacting and catalyzing curing amines useful herein each effect a cure in the epoxy resins and each impart desirable characteristics to the cured material together with certain undesirable characteristics. It has been found that by employing a mixture of certain reacting and catalyzing curing amines, various desirable properties may be obtained in the cured resin with the undesirable characteristics being minimized.

Secondary amines are peculiar in that they may fall into either general class, depending on their structure. Secondary mono amines are not useful as reacting curing amines because there is not present at least one active or available hydrogen atom on each of at least two amino-nitrogen atoms. Thus, a mono secondary amine is not able to bridge two epoxy molecules and effect a cure. However, if the mono secondary amine has a short chain alkyl group of from 1 to 3 carbon atoms attached to the amino-nitrogen atom along with the active hydrogen, then the mono secondary amine will cure epoxy resins as a catalyzing curing agent. If the alkyl group is larger than 3 carbon atoms, the catalytic curing activity is greatly depressed and considerable heat must be applied to force such amine to cure catalytically.

As to secondary polyamines, if there is not present on any of the amino-nitrogen atoms an alkyl group of from 1 to 3 carbon atoms, such amines will behave as reacting curing amines with the catalyzing curing properties being substantially insignificant.

As to mixed polyamines, i.e., those containing perhaps primary and secondary amine groups or primary, secondary and tertiary, etc., but which contain no short alkyl group (1–3 carbon atoms) present on the amino-nitrogen atoms, such amines will act as reacting curing amines if each of at least two amino-nitrogen groups contain at least one active or available hydrogen atom.

In summary then, reacting curing amines must contain at least one active or available hydrogen attached to each of at least two amino-nitrogen atoms. Most primary and secondary polyamines without the presence of an alkyl group of from 1 to 3 carbon atoms on an amino-nitrogen atom fall in this class. Further, the reacting curing amines may be aliphatic, aromatic or of any other nature, i.e., oxygenated or polyamide, etc.

Catalyzing curing mono or poly amines must contain at least one alkyl group of from 1 to 3 carbon atoms on an amino-nitrogen atom and no more than one amino-nitrogen atom having attached thereto available hydrogen. Thus, tertiary amines with at least one alkyl group of from 1 to 3 carbon atoms attached to an amino-nitrogen atom are catalyzing curing amines. Secondary mono amines which contain an alkyl chain of from 1 to 3 carbon atoms on an amino-nitrogen atom effect cures with epoxy resins as catalyzing curing agents.

It is felt that the presentation of certain structural formulas at this point would serve to aid in the disclosure of the present invention. Since the number of variations of the different types of amines useful herein are indeed great, only a few formulas have been chosen which do represent the general premises but do not purport to include each and every variation. With the basic principle disclosed and illustrated, those skilled in the art will be able to properly catagorize all useful amines.

The most important reacting curing amines are the primary and secondary polyamines having the following structural formulas:

Primary—

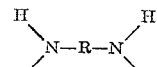

Secondary—

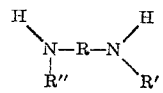

wherein R' and R" are organic groups of more than 3 carbon atoms and R is an alkylene, phenylene or any other aliphatic, aromatic or mixed organic group.

Tertiary amines, for the most part, are catalyzing curing amines and may be represented by the following structural formula:

$$R-N-R'$$
$$|$$
$$R''$$

wherein R, R' and R" may be the same or different organic radicals but at least one of which must be an alkyl group of from 1–3 carbon atoms.

Those mono secondary amines which are useful as catalyzing curing amines may be represented by the formula:

$$H$$
$$|$$
$$R-N-R'$$

where R and R' may be the same or different organic radicals but one must be an alkyl group of from 1–3 carbon atoms.

The mixed amines may be illustrated as follows:

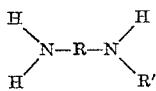

wherein R is an alkylene, phenylene or any other organic radicle and R' is an organic group of more than 3 carbon atoms. This type will cure as a bridging agent or reacting curing amine.

Further, if a primary or secondary amine group is present with a tertiary group as follows:

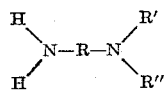

R is an alkylene, phenylene or other organic group.

The amine will not cure epoxy resins if neither R' or R" is an alkyl group of from 1–3 carbon atoms, but will cure as a catalyzing curent agent if R' or R" or both should be an alkyl group of from 1–3 carbon atoms.

However, the catalyzing mono and polyamines cannot be straight aromatic amines, as at least one amino group must be attached to an aliphatic carbon. Dimethyl aniline $C_6H_5N(CH_3)_2$ is an example of a straight aromatic tertiary amine, and has no catalyzing curing efficiency. The direct bond of the amino-nitrogen atom to an electron attracting group, e.g., phenyl, causes the unshared electron pair to enter into a resonance. Consequently the electron is not available for proton binding. Further, when the resonance effect of an aryl group is substantially eliminated by an insulating aliphatic carbon atom, then the amine will cure epoxy resins as a catalyst. An example of this is dimethyl benzyl amine $[C_6H_5CH_2N(CH_3)_2]$ which is a good catalyzing curing amine. Such compounds are considered as aromatic substituted aliphatic amines.

Broadly stated then, this invention comprises the method of curing a polyepoxy-polyhydroxy ether resin which comprises admixing with said ether resin in an amount sufficient to harden said resin, a mixture of (a) at least one amine selected from the group consisting of tertiary amines which contain at least one tertiary amino group having attached thereto at least one alkyl group of from 1 to 3 carbon atoms and no more than one amino-nitrogen atom containing active hydrogen and secondary amines which contain at least one alkyl group of from 1 to 3 carbon atoms attached to an amino-nitrogen atom and no more than one amino-nitrogen atom containing active hydrogen and (b) at least one polyamine selected from the group consisting of primary polyamines, secondary polyamines, and mixed primary-secondary polyamines which contain at least one available hydrogen atom attached to each of at least two amino-nitrogen atoms, the substituent organic radicles on the secondary amino-nitrogen atoms containing more than 3 carbon atoms.

As indicated above, the epoxy resins contemplated herein are the polyepoxy-polyhydroxy ether resins, preferably the polyglycidal ethers of polyhydric phenols.

Normally, about 8% to 10% by weight based on the weight of the epoxy resin has been found to be a satisfactory amount of amine curing agent although more or less amine curing agent may be used, i.e., 4% to 12%.

Suitable epoxy resins are fully disclosed in the following patents: 2,528,932 to Wiles and Newey dated Nov. 7, 1950, and 2,541,027 to Bradley dated Feb. 13, 1951.

To state briefly the mode of manufacture of polyglycidal polyethers of polyhydric phenols, these materials are obtained by reacting at about 50°C. to 150° C., 1 to 2 mols of an epihalohydrin, e.g., epichlorohydrin with a mol of dihydric phenol, e.g., bis-(4-hydroxyphenyl)-dimethyl methane in the presence of a base such as sodium, potassium, calcium or barium hydroxide in an amount of about 10% to 30% stoichiometric excess of base to epihalohydrin, that is, 1.1 to 1.3 equivalents of base per mol of epihalohydrin. The reaction is effected in aqueous medium by first mixing together the water, dihydric phenol and the base, which mixture is then heated. The epichlorohydrin may be added rapidly as a whole and heating is continued with agitation for several hours to convert the reactants to a taffy-like mass. While hot, the agitated reaction product is washed with water until substantially free of salt. Although the product is a complex mixture of polyglycidal ethers, the principal product may be represented by the formula:

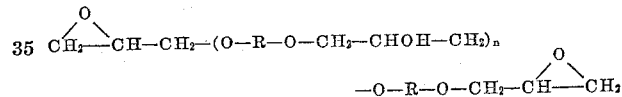

wherein R represents the divalent hydrocarbon radicle of a dihydric phenol and $n$ is of the series 0, 1, 2, 3, etc. The length of the chain can be made to vary by changing the molecular portions of epichlorohydrin to dihydric phenol.

There are many solvents useful with the polyepoxy-polyhydroxy ether resins, such as aliphatic and aromatic alcohols, ketones, ether alcohols and aromatic hydrocarbon-alcohol mixtures as well as mixtures of the other solvents. Examples of suitable solvents for the low polymer resins are xylol and butanol. Examples of suitable solvents for the higher polymer resins are methyl isobutyl ketone and the other alcohols. The aromatic hydrocarbons are primarily useful as diluents.

As stated before, the curing amines useful herein act as either chemical reactants or as catalysts. This has been substantiated by an infra-red absorption spectra study. In these tests, fluid epoxy resins were admixed with reacting curing amines and with catalyzing curing amines. The films of each were cast on NaCl crystal plates which were specially framed in order to insure that the infra-red absorption spectra would be taken from the same spot on the film. The absorption spectra were registered after 15 minutes, 1 hour, 2 hours, 4 hours, 1 month and 3 months. This detailed examination of the infra-red absorption curves showed a sharp distinction between reacting and catalyzing curing amines.

Figure 2:
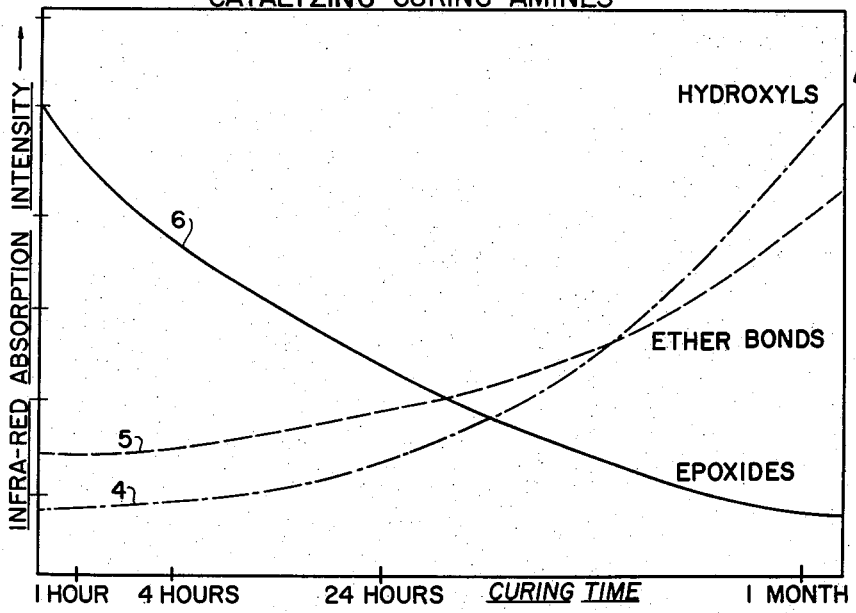

FIGS. 1 and 2 in the annexed drawing illustrate the results obtained.

When reacting curing amines were added to the epoxy resins, there was noticed a rapid and continuous increase in the amount of hydroxyl groups right from the very start, as shown in FIG. 1, line 1. After 24 hours, the increase in the amount of hydroxyl groups present was very slight. In respect to the amount of ether bonds present, line 2 of FIG. 1, it was found that reacting curing amines caused a very slight increase in the beginning with substantially no change after 3 or 4 hours. The amount of epoxide rings, however, decreased rapidly at the beginning and showed no apparent decrease after 24 hours, as shown in line 3. Thus, it can be seen that reacting curing amines cause a rapid destruction of the epoxide groups into hydroxyl groups and the subsequent formation of linear molecules.

The resins which were cured with catalyzing curing amines showed substantially no change in the amount of hydroxyl groups present at the beginning, as shown in FIG. 2, line 4. However, the amount increased rapidly after 24 hours. The saturated ether bonds increased slowly at the beginning and not quite as rapidly as the hydroxyls after 24 hours, as shown in line 5. The number of epoxide rings, line 6, decreased continuously but moderately over a prolonged period of time. Thus, the results from FIG. 2 indicate that very little linear molecule formation is present when employing catalyzing curing amines. Catalyzing curing amines cause the reaction of hydroxyl groups with the epoxide groups of the epoxy resin to form new ether bonds. In other words, reacting curing amines effect the formation of linear molecules, whereas catalyzing curing amines effect etherification between adjacent epoxy resin molecules. Catalyzing curing amines also effect etherification between adjacent linear chains of epoxy resin molecules and reacting curing polyamines. Reacting curing amines act chemically by entering into a reaction with the epoxide rings, thus forming new hydroxyls and imides, as for instance:

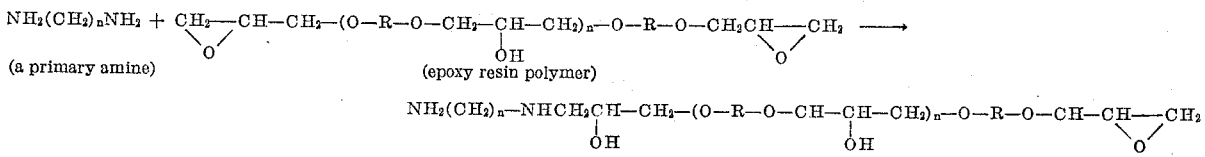
(a primary amine)       (epoxy resin polymer)

wherein R represents the divalent hydrocarbon radical of a dihydric phenol and $n$ is of the series 0, 1, 2, 3, etc.

When a reacting curing polyamine reacts with the epoxide ring of the epoxy resin, an additional hydroxyl group is formed and this is borne out by the infra-red absorption spectra data previously mentioned, line 1 of FIG. 1. The reaction shown above is about 80% complete after the first 4 to 8 hours of film aging. Long linear molecules are formed by the reaction between epoxy resins and reacting curing polyamines, and films formed therefrom are flexible. It has been found that such films become brittle upon aging. Infra-red absorption spectra data shows a slight increase in the formation of ether bonds after a considerable length of time as shown in line 2, FIG. 1. The formation of ether bonds indicates a linking between linear molecules. Embrittlement upon aging is due to the fact that when reacting curing poly amines enter into reaction with the epoxide rings of an epoxy resin, a secondary amine results and begins to effect the curing of the resin as a catalyst and initiates the formation of ether bonds between the epoxide rings and hydroxyls. It has been found that the faster the epoxide rings are consumed by the reacting curing amines, the less chance there is for the film to become brittle. Therefore, the faster and more complete curing of the epoxy film at the very start of the reaction, the better the film flexibility and the less tendency to become brittle upon aging.

An epoxy resin-reacting curing poly amine system which is baked generally produces a brittle film as opposed to one which is first air dried and then baked. This indicates that if a film is exposed to baking, after most of the epoxide groups have already combined with reacting curing poly amines, the chance for etherification reaction is greatly diminished. Further, if the amount of reacting curing poly amine added is insufficient for complete curing, then the film formed will not only dry slowly but upon aging will become brittle. If such a formulation does not contain enough reacting curing amine and is exposed to baking it yields a brittle film because of the existence of epoxide groups which have not been taken up by such amines.

From the infra-red absorption data it was found that catalyzing curing amines are very effective in producing new ether bonds in the resin molecule. This is accomplished by the reaction of the hydroxyl of one molecule with the epoxide ring of another molecule, as for instance:

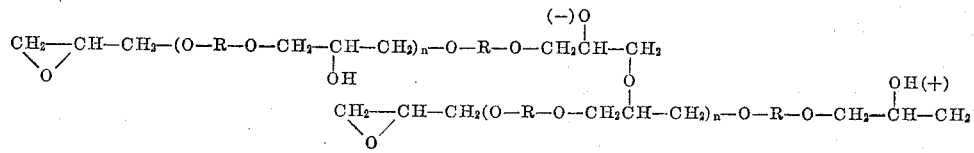

wherein R represents the divalent hydrocarbon radical of a dihydric phenol and $n$ is of the series 0, 1, 2, 3, etc.

The catalyzing curing amine physically attaches itself to the large polymer indicated above and promotes further polymerization. This type of polymer is three dimensional in structure and tends to yield a brittle film.

It was noted in the infra-red spectra study that catalyzing curing amines cause the rapid and continuous formation of ether bonds. In the beginning of curing, most of the epoxide groups transform into ether bonds while there is little increase in the number of hydroxyl groups. Later on, more epoxide groups are opened and some of these form bonds with the existing hydroxyls and others simply form new hydroxyl groups without further reaction. Thus, the amount of hydroxyls begins to increase rapidly. From the tests above mentioned, when catalyzing curing amines are used to cure epoxide resins, it was found that the films have less thermoplasticity than is obtained with reacting curing poly amines because of the three dimensional character of the polymer formed. Next, it was found that the three dimensional character of the polymer imparts better resistance to solvents. Finally, it was found that the three dimensional character of the polymer is responsible for greater brittleness in the film.

In summary, the polyepoxy-polyhydroxy ether resins when cured with reacting poly amines yield films which exhibit thermoplasticity, have a tendency to soften with strong solvents, exhibit a haze on the surface of the film and stain easily. Further, linear polymers formed by the reacting curing polyamines, exhibit excellent film flexibility, improved adhesion to materials such as aluminum and glass, and less tendency of the film to become brittle upon aging.

The films formed from the polyepoxy-polyhydroxy ether resin-catalyzing curing amine mixtures do not exhibit thermoplasticity, but do exhibit good solvent resistance and high film strength. However, such films exhibit a tendency toward brittleness.

It was then found that instead of using a single amine as the curing agent for epoxy resins, a mixture of a reacting and a catalyzing curing amine could be employed to achieve highly desirable results. This mixture of reacting and catalyzing curing amines yielded films which exhibited no haze, no thermoplasticity, and very good solvent resistance. The films also exhibited higher strength, better gloss retention, better flow and although brittleness increased slightly, the brittleness had not reached the point where it would interfere with the flexibility of the film, particularly on rigid surfaces.

As a curing composition for epoxy resins, a general range of from 30 to 90% of a reacting curing poly amine and 70 to 10% of a catalyzing curing amine may be employed. However, the preferred range is from about 40 to about 60% of reacting curing poly amine and 60 to 40% of the catalyzing curing amine. Normally, haze begins to appear in the film at about 80% concentration of reacting curing poly amine. However, with high humidity and low temperature, haze becomes evident at concentrations of approximately 60% reacting curing poly amine.

From these discoveries it is now possible to tailor the properties desired in a film or coating. Generally, the greater the percentage of the reacting curing poly amine, the more flexible the film but thermoplasticity is greater and there is a greater tendency to haze. On the other hand, with a greater proportion of catalyzing curing amine present, the films formed therefrom exhibit less thermoplasticity with somewhat decreased flexibility. However, if the proportions of reacting and catalyzing curing amines are kept within the limits mentioned above, a satisfactory compromise in properties is achieved.

When a single amine is employed to cure epoxy resins, the amount of amine used is rather critical in that certain undesirable properties are imparted to the resin should the amount be more or less than that range of amounts necessary for satisfactory cure. Since, in the practice of this invention, at least two amines are used in approximately the same total amount where one amine was employed before, there is more flexibility in the critical amounts of either type of curing amine (reacting or catalyzing) before the undesirable properties become apparent.

Generally, as stated in detail previously, the reacting curing amines are primary poly amines and in certain cases, secondary poly amines. In any event, the reacting curing poly amines must contain at least one active hydrogen atom attached to each of at least two amino-nitrogen atoms with no alkyl group of 1–3 carbon atoms attached to an amine-nitrogen. Examples of some of these are diethylene triamine, triethylene tetramine, tetra-ethylene pentamine, aminoethyl ethanolamine, hydrazine, ethylene diamine, 1,3-propanediamine, 1,4-butane diamine, 1,6-hexane-diamine, 3,3'-imino-bispropylamine, 1,2-propane diamine, 1,5-pentane diamine and phenylene diamine.

The catalyzing curing amines useful herein are those selected from the group consisting of tertiary amines having at least one tertiary amino group with at least one alkyl group of from 1–3 carbon atoms attached thereto and no more than one amino-nitrogen with one active hydrogen attached thereto, and secondary amines which contain a short chain alkyl group attached to the amino-nitrogen group with no more than one amino nitrogen having an active hydrogen attached thereto as explained before. Tertiary amines are characterized by the formula:

wherein R, R' and R'' are the same or different organic radicals. Examples of a few of these catalyzing curing amines are dimethylethanolamine, dimethylpropylamine, dimethylbutylamine, dimethyloctylamine, dimethylethylamine, mono-methyl-diethylamine, diethylethanolamine, dimethyl decyl amine, monomethyl ethyl butyl amine, monomethyl dibutyl amine, monomethyl dipropyl amine, NN-dimethyl amino butyl amine, NN-dimethyl-amino hexyl amine, NN-diethyl amino butylamine, tetramethyl ethylene diamine, tri-methyl ethylene diamine, tetramethyl propylene diamine, tetraethyl ethylene diamine, triethyl ethylene diamine, tetraethyl propylene diamine, NN-diethylamino ethylamine, dimethylamino-propylamine, diethylamino-propylamine, dimethylamino-methyl phenol, and tri-(dimethyl-aminomethyl) phenol. It does not matter if the tertiary amine is mixed, that is, contains one primary or secondary group along with the tertiary group. As long as one tertiary amine group is present, with an alkyl group of from 1 to 3 carbon atoms thereon, the entire amine will act as a catalyzing curing agent and cause etherification between adjacent resin molecules rather than the formation of long chain polymers.

The amines contemplated in this invention may be employed as free amines, or in the form of adducts.

It becomes convenient to illustrate the invention by giving specific examples of compositions embodying the invention which use the free amines and the mode of compounding and using them, such examples being, however, for the purpose of illustrating the invention and not limiting it to the precise scope of such examples.

EXAMPLE 1

| | Percent |
|---|---|
| Diethylene triamine | 72–25 |
| Dimethyl amino propyl amine | 25–75 |

This is a very fast drying, non-hazing curing agent, which produces good flow and gloss.

EXAMPLE 2

| | Percent |
|---|---|
| 3,3' imino bispropyl amine | 40 |
| Amino ethyl ethanol amine | 30 |
| Dimethyl amino propyl amine | 30 |

This is a fast drying, non-hazing, good color retentive curing agent, which also produces a flexible film.

EXAMPLE 3

| | Percent |
|---|---|
| 1,6 hexane diamine | 40 |
| Amino ethyl ethanol amine | 30 |
| Diethylamino propylamine | 30 |

This is a fast drying, non-hazing, good color retentive curing agent, which also produces a very flexible film.

EXAMPLE 4

| | Percent |
|---|---|
| Diethylene triamine | 75–60 |
| Dimethyl butyl amine | 25–40 |

This is a very fast air drying, non-hazing curing agent.

EXAMPLE 5

| | Percent |
|---|---|
| Trimethylene tetramine | 75–60 |
| Dimethyl caproyl amine | 25–40 |

This is an air-drying, non-hazing curing agent.

EXAMPLE 6

| | Percent |
|---|---|
| Triethylene tetramine | 75–60 |
| Tetramethyl propylene diamine | 25–40 |

This is an air-drying, non-hazing agent which produces good flow and gloss.

EXAMPLE 7

| | Percent |
|---|---|
| Diethylene triamine | 75–60 |
| Tri-(dimethyl amino methyl) phenol | 25–40 |

This is a very fast air drying, non-hazing agent.

EXAMPLE 8

|  | Percent |
|---|---|
| 3,3'-imino bispropyl amine | 75–60 |
| Diethylamino propyl amine | 25–40 |

This is a fast air-drying, non-hazing, color retentive curing agent, which produces a good flow and gloss.

EXAMPLE 9

|  | Percent |
|---|---|
| 3,3'-imino bispropyl amine | 75–60 |
| Dimethylamino methyl phenol | 25–40 |

A fast air-drying curing agent.

Examples 10 through 15 include curing agents for forced or slow air-drying formulations.

Example 10

|  | Percent |
|---|---|
| Tetraethylene pentamine | 75–50 |
| Monomethyl diethyl amine | 25–50 |

This is a curing agent which produces good flow and gloss.

Example 11

|  | Percent |
|---|---|
| Tetraethyl ethylene diamine | 25–50 |
| Tetraethylene pentamine | 75–50 |

This is a curing agent, which produces good flow.

Example 12

|  | Percent |
|---|---|
| 1,6 hexane diamine | 60 |
| Diethylamino propyl amine | 40 |

This is a good color retentive curing agent which produces good flow and gloss.

Example 13

|  | Percent |
|---|---|
| Diethyl amino propyl amine | 40 |
| Aminoethyl ethanol amine | 30 |
| Ethylene diamine | 30 |

This is a good color retentive curing agent, which produces a flexible film.

Example 14

|  | Percent |
|---|---|
| Diethyl amino propyl amine | 50 |
| Amino ethyl ethanol amine | 50 |

This is a good color retentive curing agent.

Example 15

|  | Percent |
|---|---|
| Tetraethylene pentamine | 60 |
| Diethylamino propyl amine | 40 |

This curing agent produces good flow and gloss.

The percentages in the foregoing examples are by volume.

As indicated previously, for most satisfactory results, the aboves examples of amine curing compositions are employed in amounts of from about 8% to about 10% by weight based on the weight of the liquid epoxy resin to be cured. However, more or less amine curing composition may be employed, i.e., from about 4% to about 12%.

The amines may also be added to the epoxy resins in the form of adducts. In this manner, the toxicity of amines is highly depressed, with consequent greater ease of handling, etc. Ordinarily, two adducts may be employed in this modification of the present invention. One is made from an epoxy resin and a reacting curing amine, and the second adduct is made from an epoxy resin and catalyzing curing amines which contain only one amino-nitrogen atom having available hydrogen thereon. Tertiary amines without available hydrogen will not form adducts. These two adducts can then be mixed together with the resultant mixture being very stable. This constitutes package A of a two package formulation. Package B consists of the dissolved straight epoxy resin. It is then only necessary to mix packages A and B when desired.

Following are details of the preparation of adducts from epoxy resins and reacting and catalyzing curing amines.

Adduct 1 (Reacting Amine)

|  | Percent |
|---|---|
| Epoxy resin with epoxide equivalent 280 | 70.5 |
| Hydrazine (85%) | 9.5 |
| Benzol alcohol (high boiling solvent) | 20.0 |

The mixture is stirred until it starts to heat up, then it is left to react by iself. Artificial cooling is applied to keep the reaction within bounds. After completion of the reaction, excess amine is removed by heating. The adduct may be reduced with low boiling alcohols.

Adduct 2 (Reacting Amine)

|  | Percent |
|---|---|
| Epoxy resin with epoxide equivalent of 500 | 55.0 |
| Ethylene diamine (85%) | 7.8 |
| Benzyl alcohol (solvent) | 37.2 |

The resin is dissolved in the benzyl alcohol, with the amine being added later. Heat is applied with moderate stirring to initiate the reaction and to help remove materials which are easily evaporated.

Adduct 3 (Reacting Amine)

|  | Percent |
|---|---|
| Epoxy resin with epoxide equivalent of 200 | 52.5 |
| Aminoethyl ethanolamine | 27.5 |
| Benzyl alcohol | 20.0 |

The mixture is heated to 180° F.–190° F. in order to initiate the reaction and then left to react by itself for 4 to 6 hours. The mixture later may be reduced with low boiling alcohols to approximately 50–60% non-volatile matter (NVM).

Adduct 4 (Reacting Amine)

|  | Percent |
|---|---|
| Epoxy resin with an epoxide equivalent of 200 | 34.2 |
| NN'-di(hydroxyethyl) ethylene diamine | 25.3 |
| Benzyl alcohol | 40.5 |

The suspension is heated up until the crystals of the amine melt and the exothermic reaction begins. The reaction is allowed to go to completion by itself.

Adduct 5 (Catalyzing Amine)

|  | Percent |
|---|---|
| Epoxy resin with epoxide equivalent of 200 | 40.0 |
| Dimethyl amino propylamine | 20.0 |
| Benzyl alcohol | 40.0 |

The mixture is heated up to 100° C. and is kept there under reflux for 3 to 4 hours. The free unreacted amines are then boiled off.

Adduct 6 (Catalyzing Amine)

|  | Parts |
|---|---|
| Styrene oxide | 120 |
| Diethylamino propylamine | 130 |

Styrene oxide and diethylamino propylamine are heated together under reflux at a temperature of 220° F.–230° F. After the exothermic reaction the temperature of the mixture raises to about 400° F. and must be cooled down to avoid overboiling.

The following examples illustrate the use of reacting curing amine adducts and free catalyzing curing amines to cure epoxy resins.

EXAMPLE 16

Package A: Percent
- Adduct 1 _____ 75
- Butanol _____ 24
- Diethylamino propyl amine _____ 1

Package B:
- Epoxy resin with epoxide equivalent of 280 ____ 80
- Xylol and butanol (1:1 by volume) _____ 20

100 parts of package A and 114 parts of package B yield a film of good solvent resistance, low thermoplasticity and very good flexibility and adhesion. The pot life time is about 2–3 hours.

EXAMPLE 17

Package A: Percent
- Adduct 1 _____ 75
- Propanol _____ 24
- Diethylamino propyl amine _____ 1

Package B:
- Epoxy resin with epoxide equivalent 500 _____ 60
- Xylol and butanol (1:1 by volume) _____ 40

A mixture of 100 parts package A and 196 parts package B gives a film having fair solvent resistance and no thermoplasticity. Pot life time is around 6–8 hours.

EXAMPLE 18

Package A: Percent
- Adduct 2 _____ 80
- Butanol _____ 18
- Dimethylamino propylamine _____ 2

Package B:
- Epoxy resin with epoxide equivalent 500 _____ 60
- Xylol and butanol (1:1 by volume) _____ 40

A mixture of 100 parts package A and 93 parts Package B gives a non-thermoplastic film. Pot life time of the formulation is around 12 hours. The composition is applicable as a baking type finish.

EXAMPLE 19

Package A: Percent
- Adduct 3 _____ 75
- Propanol _____ 24
- Dimethylamino propylamine _____ 1

Package B:
- Epoxy resin with epoxide equivalent 280 _____ 70
- Xylol and butanol (1:1 by volume) _____ 30

A mixture of 100 parts package A and 100 parts package B gives a film having good solvent resistance, and very slight thermoplasticity. Pot life time is around 2 hours.

EXAMPLE 20

Package A: Percent
- Adduct 3 _____ 75
- Butanol _____ 23
- Diethylamino propylamine _____ 2

Package B:
- Epoxy resin with epoxide equivalent 500 _____ 60
- Xylol and butanol (1:1 by volume) _____ 40

A mixture of 100 parts package A and 207 parts package B gives a non-thermoplastic film, having an acceptable solvent resistance. Pot life time is around 4–8 hours.

EXAMPLE 21

Package A: Percent
- Adduct 4 _____ 80
- Butanol _____ 19
- Dimethylamino propylamine _____ 1

Package B:
- Epoxy resin with epoxide equivalent 200 _____ 80
- Xylol and butanol (1:1 by volume) _____ 20

A mixture of 100 parts package A and 43 parts package B gives a film which is non-thermoplastic and has good solvent resistance. Pot life time is 4–5 hours.

EXAMPLE 22

Package A: Percent
- Adduct 4 _____ 80
- Butanol _____ 19
- Tri-(dimethylamino methyl)phenol amine _____ 1

Package B:
- Epoxy resin with epoxide equivalent 500 _____ 60
- Xylol and butanol (1:1 by volume) _____ 40

A mixture of 100 parts package A and 150 parts package B gives a good baking type coating. Pot life time is around 72 hours.

The following examples illustrate the mode of using adducts of both the reacting curing amines and catalyzing curing amines to cure epoxy resins.

EXAMPLE 23

Package A: Percent
- Adduct 3 _____ 80
- Propanol _____ 15
- Adduct 5 _____ 5

Package B:
- Epoxy resin with epoxide equivalent 500 _____ 60
- Xylol and butanol (1:1 by volume) _____ 40

A mixture of 100 parts package A and 200 parts package B gives a non-thermoplastic film having acceptable solvent resistance. Pot life time is around 4–8 hours.

EXAMPLE 24

Package A: Percent
- Adduct 2 _____ 80
- Butanol _____ 16
- Adduct 6 _____ 4

Package B:
- Epoxy resin with epoxide equivalent 500 _____ 60
- Xylol and butanol (1:1 by volume) _____ 40

A mixture of 100 parts package A and 93 parts package B gives a baking time coating, having highly depressed thermoplasticity. Pot life time is around 12 hours.

EXAMPLE 25

Package A: Percent
- Adduct 1 _____ 75
- Propanol _____ 20
- Adduct 5 _____ 5

Package B:
- Epoxy resin with epoxide equivalent 280 _____ 80
- Xylol and propanol (1:1 by volume) _____ 20

A mixture of 100 parts package A and 114 parts package B gives a good solvent resistant, non-thermoplastic film having a very good film flexibility. Amine toxicity is diminished or practically eliminated. Pot life time 2–3 hours.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. The method of curing a polyepoxy-polyhydroxy ether resin which is a glycidyl polyether of a polyhydric phenol having a 1,2-epoxy equivalency between 1 and 2 which comprises admixing with said ether resin in an amount sufficient to harden said resin, from about 4% to about 12% by weight of said ether resin of a mixture of (a) from about 70% to 10% by volume of at least one amine selected from the group consisting of tertiary amines which contain at least one tertiary amino group having attached thereto an alkyl group of from 1 to 3 carbon atoms and no more than one amino-nitrogen atom with available hydrogen, and secondary amines which contain an alkyl group of from 1–3 carbon atoms attached to an amino-nitrogen atom and no more than one amino-nitrogen atom with available hydrogen; and (b) from about 30% to about 90% by volume of at least one polyamine selected from the group consisting of primary polyamines, secondary polyamines, and mixed primary-secondary polyamines which contain at least one available hydrogen atom attached to each of at least two amino-nitrogen atoms, the substituent organic radicals on the secondary amino-nitrogen atoms containing more than 3 carbon atoms.

2. The method of curing a polyepoxy-polyhydroxy ether resin which is a glycidyl polyether of a polyhydric phenol having a 1,2-epoxy equivalency between 1 and 2 which comprises admixing with said ether resin from about 4% to about 12% by weight of a mixture of from about 30% to about 90% by volume of 3,3'-imino bis-propylamine and from about 70% to about 10% by volume of dimethyl hexylamine.

References Cited in the file of this patent

UNITED STATES PATENTS

| | | |
|---|---|---|
| 2,585,115 | Greenlee | Feb. 12, 1952 |
| 2,651,589 | Shokal | Sept. 8, 1953 |
| 2,712,535 | Fisch | July 5, 1955 |
| 2,717,885 | Greenlee | Sept. 13, 1955 |

FOREIGN PATENTS

| | | |
|---|---|---|
| 153,577 | Australia | Oct. 17, 1950 |

OTHER REFERENCES

Narracott: British Plastics, vol. 24, page 341, October 1951.